United States Patent
Wen et al.

(10) Patent No.: US 10,419,150 B2
(45) Date of Patent: Sep. 17, 2019

(54) METHOD OF CONFIGURING AUTOMATICALLY WAVELENGTH OF OPTICAL NETWORK UNIT

(71) Applicant: Alcatel Lucent, Boulogne-Billancourt (FR)

(72) Inventors: Haibo Wen, Shanghai (CN); Shuigen Yang, Shanghai (CN); Fanxiang Bin, Shanghai (CN)

(73) Assignee: Alcatel Lucent, Boulogne Billancourt (FR)

( * ) Notice: Subject to any disclaimer, the term of this patent is extended or adjusted under 35 U.S.C. 154(b) by 591 days.

(21) Appl. No.: 14/764,362

(22) PCT Filed: Jan. 14, 2014

(86) PCT No.: PCT/IB2014/000150
§ 371 (c)(1),
(2) Date: Jul. 29, 2015

(87) PCT Pub. No.: WO2014/122525
PCT Pub. Date: Aug. 14, 2014

(65) Prior Publication Data
US 2015/0365190 A1    Dec. 17, 2015

(30) Foreign Application Priority Data

Feb. 6, 2013  (CN) .......................... 2013 1 0048399

(51) Int. Cl.
*H04J 14/00* (2006.01)
*H04J 14/02* (2006.01)

(52) U.S. Cl.
CPC ........ *H04J 14/0232* (2013.01); *H04J 14/025* (2013.01); *H04J 14/0223* (2013.01);
(Continued)

(58) Field of Classification Search
None
See application file for complete search history.

(56) References Cited

U.S. PATENT DOCUMENTS

2008/0138072 A1* 6/2008 Sakamoto ........... H04J 14/0226
398/68
2008/0166127 A1* 7/2008 Kazawa ................ H04J 14/025
398/79
(Continued)

FOREIGN PATENT DOCUMENTS

CN       101621454 A       1/2010
CN       101742365 A       6/2010
(Continued)

OTHER PUBLICATIONS

International Search Report PCT/ISA/210 for International Application No. PCT/IB2014/0001580 dated Jul. 15, 2014.
(Continued)

Primary Examiner — Tesfaldet Bocure
(74) Attorney, Agent, or Firm — Harness, Dickey & Pierce, P.L.C.

(57) ABSTRACT

In one embodiment, an optical line terminal judges whether the optical network unit operates at a correct uplink wavelength and a correct downlink wavelength during an optical network unit activation progress; and broadcasts a wavelength configuration message if the optical network unit does not operate at the correct uplink wavelength and the correct downlink wavelength to instruct the optical network unit to tune its uplink wavelength and downlink wavelength respectively to the correct uplink wavelength and the correct downlink wavelength.

14 Claims, 4 Drawing Sheets

(52) U.S. Cl.
CPC ...... *H04J 14/0246* (2013.01); *H04J 14/0257* (2013.01); *H04J 14/0267* (2013.01); *H04J 14/0282* (2013.01)

(56) References Cited

U.S. PATENT DOCUMENTS

| | | |
|---|---|---|
| 2008/0304828 A1 | 12/2008 | Mizutani et al. |
| 2011/0091213 A1* | 4/2011 | Kawaza ............... H04J 14/0282 398/68 |
| 2012/0128358 A1* | 5/2012 | Zhang ................ H04B 10/0773 398/63 |
| 2013/0094862 A1* | 4/2013 | Luo ..................... H04J 14/0278 398/68 |
| 2014/0219661 A1* | 8/2014 | Doo .................... H04J 14/0227 398/68 |
| 2015/0055955 A1* | 2/2015 | Kim .................... H04J 14/0239 398/69 |

FOREIGN PATENT DOCUMENTS

| | | |
|---|---|---|
| CN | 101944966 A | 1/2011 |
| CN | 102104812 A | 6/2011 |
| EP | 2479906 A1 | 7/2012 |
| WO | WO-2012/136155 A1 | 10/2012 |
| WO | WO-2012136153 A1 | 10/2012 |

OTHER PUBLICATIONS

Yuanqiu Luo Huawei China: "Draft document of G.multi;C 1849", ITU-T Draft ; Study Period 2009-2012, International Telecommunication Union, Geneva ; CH, vol. 2/15, Nov. 22, 2011.

Yuanqiu Luo et al.: "Wavelength management in time and wavelength division multiplexed passive optical networks (TWDM-PONs)", Global Communications Conference (GLOBECOM), 2012 IEEE, IEEE, Dec. 3, 2012.

Chinese Office Action dated May 28, 2018 issued in Chinese Application No. 201710470910.X.

Communication from European Patent Office dated Jun. 17, 2019 in corresponding European Patent Application No. 18173998.8.

* cited by examiner (PRIOR ART)

METHOD OF CONFIGURING AUTOMATICALLY WAVELENGTH OF OPTICAL NETWORK UNIT

FIELD OF THE INVENTION

The present disclosure relates to an optical communication technology and particularly to a method of configuring automatically a wavelength of an optical network unit during an optical network unit activation progress and a method of configuring automatically a wavelength of an optical network unit during an optical network unit operation progress.

BACKGROUND OF THE INVENTION

Along with emergence of numerous new advanced multimedia applications, for example, deployment of 3D television, remote medical services, online gaming, interactive video electronic learning and other services, there has been a significantly growing demand for a network bandwidth carrying these applications. The Next Generation Passive Optical network (NG-PON2) has become a hot topic of the Telecommunication Standardization Sector of the International Telecommunications Union (ITU-T) and the Full Service Access Network (FSAN). The majority of operators expect the NG-PON2 to offer a larger bandwidth, a high splitting ratio, a longer transmission distance and a higher access capacity. At present the demands of the NG-PON2 have been ascertained by the FSAN and the ITU-T to increase an available bandwidth to a rate up to 40 Gb/s.

In the recent FSAN meeting, among all the candidate technical solutions, the Time Wavelength Division Multiplexing-Passive Optical Network (TWDM-PON) has been considered in the industry as a primary solution to the NG-PON2, where 4 10G XG-PONs are stacked into the TWDM-PON with a typical splitting ratio of 1:64 to thereby achieve an aggregate rate of 40 Gb/s in the downlink and 10 Gb/s in the uplink. Within a single wavelength, the TWDM-PON reuses downlink multiplexing and uplink access techniques, a timeslot granularity, a multicast capability and a bandwidth allocation mechanism of XG-PON (that is, 10GPON).

There are typically the following common demands in existing applications of the TWDM-PON:

1. If there are only a few active optical network units, then all the optical network units need to be adjusted to operate at the same uplink wavelength and downlink wavelength in order to save energy.

2. If an infrastructure provider of the TWDM-PON leases the infrastructure network to a number of virtual network operators, then optical network units corresponding to the respective different virtual network operators need to be provided with corresponding wavelengths. This requires the TWDM-PON to be capable of configuring effectively the relevant optical network units to enable them to operate at uplink wavelengths and downlink wavelengths leased to the virtual network operators.

3. With respect to the second demand, a customer may also be switched between the respective different virtual network operators, and this further requires the TWDM-PON to be capable of adjusting the uplink wavelengths and the downlink wavelengths of the optical network units in a timely manner.

4. If there are too may optical network units operating at the same uplink wavelength and the same downlink wavelength, then the TWDM-PON needs to adjust uplink wavelengths and downlink wavelengths of some optical network units to reduce a corresponding load for the purpose of load balancing.

However due to a large number of optical network units in an access network, it may be rather complex or difficult to configure statically the wavelengths of the optical network units or adjust manually the wavelengths of the optical network units in order to satisfy the foregoing four demands.

In view of this, there is a need of a solution to remote automatic configuration of an uplink wavelength and a downlink wavelength of an optical network unit in a TWDM-PON system (particularly during an optical network unit activation progress) to thereby satisfy effectively the foregoing exemplary demands.

SUMMARY OF THE INVENTION

As can be apparent, there has been absent in the prior art a solution to remote automatic configuration of an uplink wavelength and a downlink wavelength of an optical network unit in a TWDM-PON system (particularly during an optical network unit activation progress). Thus, it cannot realize an effective wavelength configuration for an optical network unit.

In order to address the problem in the prior art, according to a first aspect of the invention, there is proposed a method, in an optical line terminal, of configuring automatically a wavelength of an optical network unit during an optical network unit activation progress, the method including: B. judging whether the optical network unit operates at a correct uplink wavelength and a correct downlink wavelength; and C. broadcasting a wavelength configuration message, if the optical network unit does not operate at the correct uplink wavelength and the correct downlink wavelength, the wavelength configuration message including a correct uplink wavelength indication message, a correct downlink wavelength indication message, a Vendor-ID of the optical network unit and a Vendor-specific serial number of the optical network unit.

Preferably the steps B and C are performed before the optical line terminal allocates an identifier of the optical network unit for the optical network unit.

Preferably before the step B, the method further includes: A. receiving serial number information from the optical network unit, the serial number information including the Vendor-ID of the optical network unit and the Vendor-specific serial number of the optical network unit; and the step B further includes: judging whether the optical network unit operates at the correct uplink wavelength and the correct downlink wavelength according to the serial number information.

Preferably the step B further includes: judging whether the optical network unit operates at the correct uplink wavelength and the correct downlink wavelength by referring to a database in the optical line terminal, wherein the database stores a correspondence relationship between a serial number of the optical network unit and the correct uplink wavelength and correct downlink wavelength Alternatively the step B further includes: judging whether the optical network unit operates at the correct uplink wavelength and the correct downlink wavelength by communicating the serial number information of the optical network unit with another network element to obtain the correct uplink wavelength and the correct downlink wavelength at which the optical network unit shall operate. Here the other network element can be an AAA server, for example.

Preferably the correct uplink wavelength indication message includes a correct uplink wavelength value or a correct uplink wavelength channel number or wavelength adjustment information associated with the correct uplink wavelength and/or the correct downlink wavelength indication message includes a correct downlink wavelength value or a correct downlink wavelength channel number or wavelength adjustment information associated with the correct downlink wavelength. Herein the wavelength adjustment information can indicate how much the optical network element shall tune the wavelength to thereby attain the correct wavelength, for example.

According to a second aspect of the invention, there is proposed a method, in an optical network unit, of assisting an optical line terminal in configuring automatically a wavelength of the optical network unit during an optical network unit activation progress, the method including: b. receiving a wavelength configuration message broadcasted by the optical line terminal, the wavelength configuration message including a correct uplink wavelength indication message, a correct downlink wavelength indication message, a Vendor-ID of the optical network unit and a Vendor-specific serial number of the optical network unit; c. judging whether the Vendor-ID of the optical network unit and the Vendor-specific serial number of the optical network unit in the wavelength configuration message are consistent respectively with a Vendor-ID of the optical network unit itself and a Vendor-specific serial number of the optical network unit itself; and d. tuning a current uplink wavelength and a current downlink wavelength respectively to a correct uplink wavelength and a correct downlink wavelength according to the correct uplink wavelength indication message and the correct downlink wavelength indication message, if they are consistent.

Preferably before the step b, the method further includes the step a: a. sending serial number information to the optical line terminal, the serial number information including the Vendor-ID of the optical network unit itself and the Vendor-specific serial number of the optical network unit itself.

Preferably when the optical network unit can buffer the correct uplink wavelength and the correct downlink wavelength, the step d further includes: replacing the current uplink wavelength and the current downlink wavelength respectively with the correct uplink wavelength and the correct downlink wavelength. Thus next time the optical network unit is started, it will operate automatically at the correct uplink wavelength and the correct downlink wavelength to thereby avoid the optical line terminal from adjusting its wavelengths again.

According to a third aspect of the invention, there is proposed a method, in an optical line terminal, of configuring automatically a wavelength of an optical network unit during an optical network unit operation progress, wherein at least one optical network unit communicates with the optical line terminal at a first downlink wavelength as a current downlink wavelength, and the method includes: broadcasting a wavelength configuration message to the at least one optical network unit at the first downlink wavelength, the wavelength configuration message including a correct uplink wavelength indication message and a correct downlink wavelength indication message.

According to a fourth aspect of the invention, there is proposed a method, in an optical network unit, of assisting an optical line terminal in configuring automatically a wavelength of the optical network unit during an optical network unit operation progress, wherein the optical network unit communicates with the optical line terminal at a first downlink wavelength as a current downlink wavelength, and the method includes: X1. receiving a wavelength configuration message broadcasted by the optical line terminal at the first downlink wavelength, the wavelength configuration message including a correct uplink wavelength indication message and a correct downlink wavelength indication message; and X2. tuning a current uplink wavelength and a current downlink wavelength respectively to a correct uplink wavelength and a correct downlink wavelength according to the correct uplink wavelength indication message and the correct downlink wavelength indication message.

According to the third and fourth aspects of the invention, the optical line terminal can adjust optical network units operating at the same reception wavelength to thereby adjust uplink wavelengths and downlink wavelengths of these optical network units respectively to new uplink wavelengths and new downlink wavelengths.

According to a fifth aspect of the invention, there is proposed a method, in an optical line terminal, of configuring automatically a wavelength of an optical network unit during an optical network unit operation progress, the method including: sending a wavelength configuration message to the optical network unit, the wavelength configuration message including a correct uplink wavelength indication message, a correct downlink wavelength indication message and an identifier of the optical network unit, wherein the correct uplink wavelength indication message includes a correct uplink wavelength value or a correct uplink wavelength channel number or wavelength adjustment information associated with a correct uplink wavelength and/or the correct downlink wavelength indication message includes a correct downlink wavelength value or a correct downlink wavelength channel number or wavelength adjustment information associated with a correct downlink wavelength, and wherein the identifier of the optical network unit is allocated by the optical line terminal for the optical network unit during an optical network unit activation progress.

According to a sixth aspect of the invention, there is proposed a method, in an optical network unit, of assisting an optical line terminal in configuring automatically a wavelength of the optical network unit during an optical network unit operation progress, the method including: i. receiving a wavelength configuration message from the optical network unit, the wavelength configuration message including a correct uplink wavelength indication message, a correct downlink wavelength indication message and an identifier of the optical network unit, wherein the correct uplink wavelength indication message includes a correct uplink wavelength value or a correct uplink wavelength channel number or wavelength adjustment information associated with a correct uplink wavelength and/or the correct downlink wavelength indication message includes a correct downlink wavelength value or a correct downlink wavelength channel number or wavelength adjustment information associated with a correct downlink wavelength, and wherein the identifier of the optical network unit is allocated by the optical line terminal for the optical network unit during an optical network unit activation progress; and ii. tuning a current uplink wavelength and a current downlink wavelength respectively to the correct uplink wavelength and the correct downlink wavelength according to the correct uplink wavelength indication message and the correct downlink wavelength indication message.

According to the fifth and sixth aspects of the invention, the optical line terminal can adjust an uplink wavelength and a downlink wavelength of a specific optical network unit respectively to a new uplink wavelength and a new downlink wavelength directedly.

With the preferred technical solutions according to the invention, the optical line terminal can configure a wavelength of an optical network unit remotely and automatically, which can be performed, for example, during an optical network unit activation progress or during an optical network unit operation progress. Thus prolonged manual configuration can be avoided, the flexibility of the TWDM-PON can be increased, and the TWDM-PON can accommodate a higher service demand and improve the robustness thereof. For example, the optical line terminal can adjust some specific optical network unit to a corresponding uplink wavelength and downlink wavelength based upon a requirement of a virtual network operator. Also for example, in the case that there are only a few active optical network units, all the optical network units can be adjusted to operate at the same uplink wavelength and downlink wavelength to thereby save energy.

The respective aspects of the invention will become more apparent from the following description of particular embodiments.

BRIEF DESCRIPTION OF DRAWINGS

Other features, objects and advantages of the invention will become more apparent upon review of the following detailed description of non-limiting embodiments taken with reference to the drawings in which.

In the drawings, identical or like reference numerals denote identical or corresponding components or features throughout the different figures.

DETAILED DESCRIPTION OF EMBODIMENTS

Figure 1:
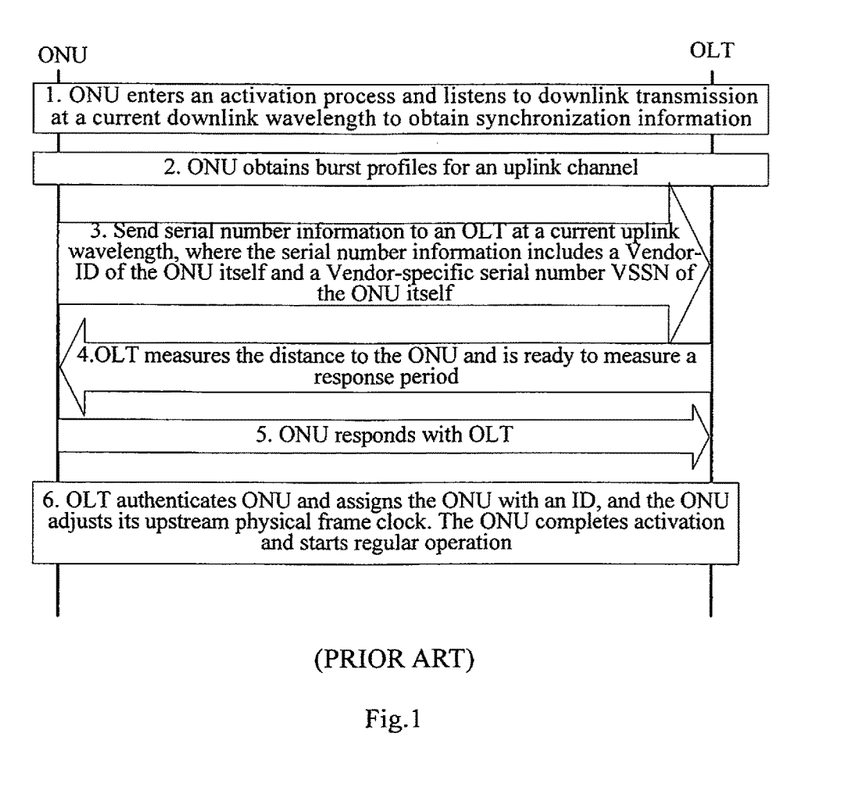
FIG. 1 illustrates a schematic flow chart of a systematic method of an activation process of an optical network unit in the prior art.

FIG. 1 illustrates a schematic flow chart of a systematic method of an activation process of an optical network unit in the prior art. Interested readers can refer to the definitions in G.987.3 for details of respective steps in FIG. 1, and a detailed description thereof will be omitted here.

Figure 2:
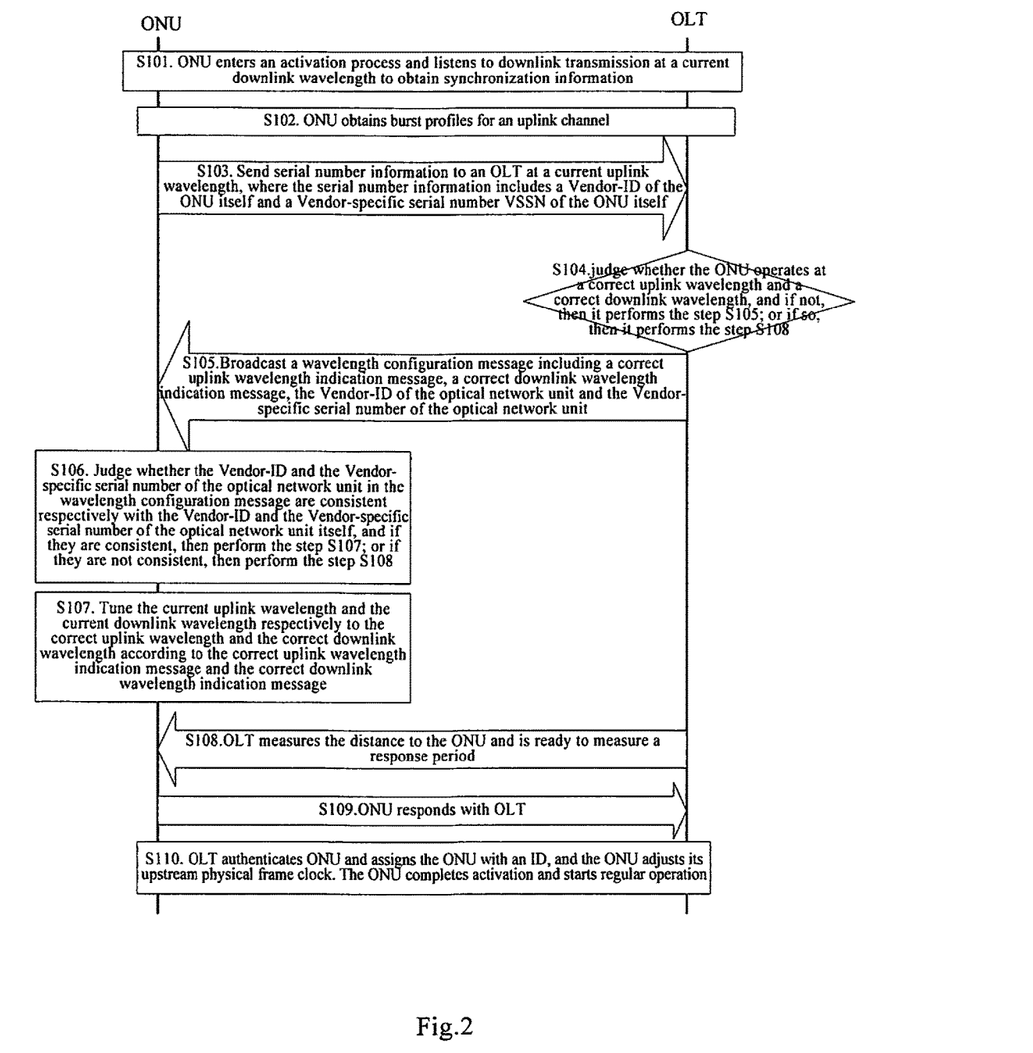
FIG. 2 illustrates a schematic flow chart of a systematic method of an activation process of an optical network unit according to an embodiment of the invention.

FIG. 2 illustrates a schematic flow chart of a systematic method of an activation process of an optical network unit according to an embodiment of the invention. As compared with FIG. 1, the invention adds operations of configuring automatically a wavelength of an optical network unit (that is, the steps S104, S105, S106 and S107) to the activation process of the optical network unit as compared with FIG. 1, so that the activation process of the optical network unit according to the invention can configure the wavelength of the optical network unit automatically.

As illustrated in FIG. 2, similarly to the prior art in FIG. 1, in the step S101, an Optical Network Unit (ONU) enters an activation process and listens to downlink transmission at a current downlink wavelength to obtain synchronization information. In the step S102, the ONU obtains burst profiles for an uplink channel. In the step S103, the ONU sends serial number information to an Optical Line Terminal (OLT) at a current uplink wavelength, where the serial number information includes a Vendor-ID of the ONU itself and a Vendor-specific serial number (VSSN) of the ONU itself.

Next according to the invention, in the step S104, the OLT judges whether the ONU operates at a correct uplink wavelength and a correct downlink wavelength. Particularly, the OLT can judge whether the ONU operates at the correct uplink wavelength and the correct downlink wavelength by referring to a database of the OLT for the serial number information of the ONU to locate the correct uplink wavelength and the correct downlink wavelength corresponding to the ONU and compare them with the current uplink wavelength and downlink wavelength of the ONU. Alternatively, the OLT can judge whether the ONU operates at the correct uplink wavelength and the correct downlink wavelength by communicating the received serial number information of the ONU with another network element (e.g., an AAA server) to obtain from the other network element the correct uplink wavelength and the correct downlink wavelength, at which the ONU shall operate, and compare them with the current uplink wavelength and downlink wavelength of the ONU. Here it shall be appreciate that since the steps S101 to S103 are performed between the ONU and the OLT, the OLT naturally can already have knowledge of the uplink wavelength and the downlink wavelength at which the ONU current operates and thus can make comparison.

If it is judged in the step S104 that the ONU does not operate at the correct uplink wavelength and the correct downlink wavelength, then the method proceeds to the step S105. If it is judged in the step S104 that the ONU already operates at the correct uplink wavelength and the correct downlink wavelength, then the method will skip the steps S105 to S107 but proceed to the steps S108 to S110 in the prior art.

Next the following description will be given of an example in which it is judged that the ONU does not operate at the correct uplink wavelength and the correct downlink wavelength and the method proceeds to the step S105.

In the step S105, the OLT broadcasts a wavelength configuration message. The wavelength configuration message includes a correct uplink wavelength indication message, a correct downlink wavelength indication message, the Vendor-ID of the optical network unit and the Vendor-specific serial number of the optical network unit. Herein the Vendor-ID of the optical network unit and the Vendor-specific serial number of the optical network unit are copied from the serial number information in the step S103.

Here the correct uplink wavelength indication message includes a correct uplink wavelength value or a correct uplink wavelength channel number or wavelength adjustment information associated with the correct uplink wavelength. The correct downlink wavelength indication message includes a correct downlink wavelength value or a correct downlink wavelength channel number or wavelength adjustment information associated with the correct downlink wavelength. Moreover according to a particular embodiment of the invention, a new Physical Layer Operations/Administration and Maintenance (PLOAM) message, that is, an Assign_ONU-Wavelength message, is defined to transport the wavelength configuration information. Table 1 depicts a format of the message, where currently reserved bytes 21-40 can be further extended to transport other configuration information of the wavelengths, for example, a relative value by which the current transmission wavelength is adjusted, etc.

| Octet | Content | Description |
|---|---|---|
| 1-2 | ONU-ID | 1. Broadcast the message, ONU-ID = 0x03FF, If Vendor-ID and VSSN fields are set to a specific ONU, then the specific ONU will be instructed to change a wavelength; and If the Vendor-ID and VSSN fields are set to 0, then all the ONUs at a reception wavelength will be instructed to change the wavelength; and 2. Direct the message, where ONU-ID is set to the ID assigned by the OLT to the ONU during an activation progress, and the Vendor-ID and VSSN fields are se tto 0 (of course, Vendor-ID and VSSN can alternatively be set to Vendor-ID and VSSN of the ONU) |
| 3 | TBD | Message type ID "Assign_ONU-Wavelength" |
| 4 | SeqNo | Broadcast a PLOAM sequence number |
| 5-8 | correct downlink wavelength indication message | The wavelength to be used by the ONU's receiver |
| 9-12 | correct uplink wavelength indication message | The wavelength to be used by the ONU's transmitter |
| 13-16 | Vendor-ID | ONU Vendor-ID (4-byte combination) received at SN information acquisition progress |
| 17-20 | VSSN | Vendor-specific serial number (4-byte unsigned integer) received at SN information acquisition progress |
| 21-40 | Reserved | Set to 0x00 by the transmitting side and treated as "don't care" by the receiving side |
| 41-48 | MIC | Message integrity check |

Table 1 Format of Assign_ONU-Wavelength Message

In this embodiment, ONU-ID is set to 0x03FF due to the broadcast message. Of course, here since the OLT has not assigned any ID to the ONU, the ONU has no ID. Moreover Vendor-ID and VSSN are set respectively to the Vendor-ID of the ONU and the Vendor-specific serial number of the ONU obtained from the ONU in the step S103.

Then in the step S106, the ONU receives the broadcast wavelength configuration message (Assign_ONU-Wavelength message) from the OLT and judges whether the Vendor-ID of the optical network unit and the Vendor-specific serial number of the optical network unit in the received wavelength configuration message are consistent respectively with the Vendor-ID of the ONU itself and the Vendor-specific serial number of the ONU itself. If they are consistent, then it indicates that the wavelength configuration message is sent to the ONU, and the method proceeds to the step S107. If they are not consistent, then it indicates that the wavelength configuration message is not sent to the ONU, and the method proceeds to the steps S108 to S110.

In the step S107, the ONU tunes the current uplink wavelength and the current downlink wavelength respectively to the correct uplink wavelength and the correct downlink wavelength according to the correct uplink wavelength indication message and the correct downlink wavelength indication message. Furthermore, the ONU can also replace the current uplink wavelength and the current downlink wavelength respectively with the correct uplink wavelength and the correct downlink wavelength in the step S107 to thereby communicate with the OLT still at the correct uplink wavelength and the correct downlink wavelength when it starts next time.

Then in the subsequent steps S108 to S109, the ONU communicates with the OLT still at the correct uplink wavelength and the correct downlink wavelength. In the step S108, the OLT measures the distance to the ONU and is ready to measure a response period. In the step S109, the ONU responds to the OLT. In the step S110, the OLT authenticates the ONU and assigns the ONU with an ID. The ONU adjusts its upstream physical frame clock and completes activation and starts regular operation. Particular operations in these steps are consistent with the prior art, and a detailed description thereof will be omitted here.

Figure 3:
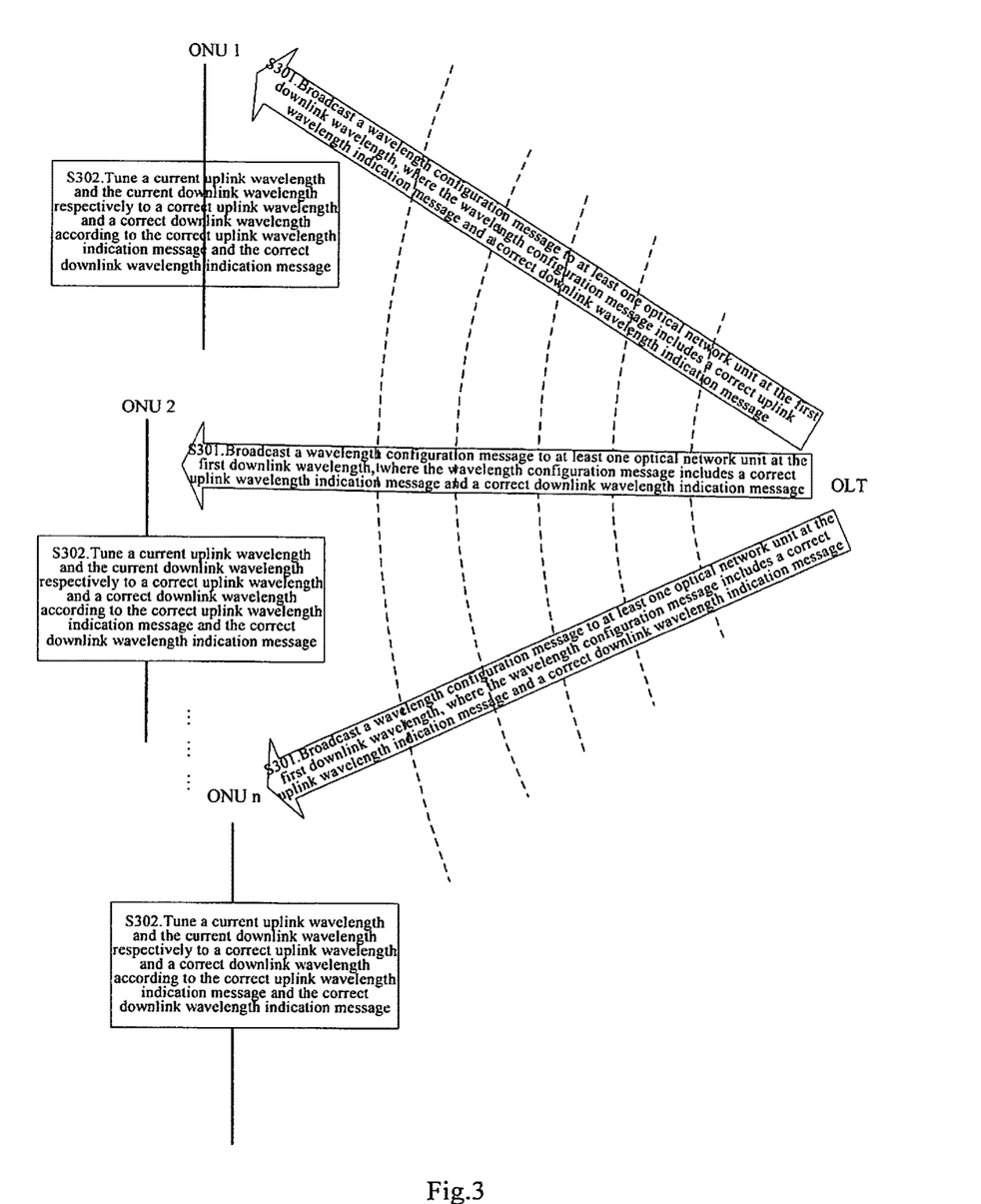
FIG. 3 illustrates a schematic flow chart of a systematic method according to another embodiment of the invention.

FIG. 3 illustrates a schematic flow chart of a systematic method according to another embodiment of the invention. In an exemplary application scenario in FIG. 3, an OLT adjusts wavelengths of all the ONUs operating at the same reception wavelength during the ONU operation progress.

As illustrated in FIG. 3, if an ONU 1 to an ONU n communicate with the OLT at a first downlink wavelength (which is any of four downlink wavelengths of the TWDM-PON system, for example) as a current downlink wavelength, then the following steps can be performed when the OLT needs to adjust the wavelengths of these ONU 1 to ONU n together.

In the step S301, the OLT broadcasts a wavelength configuration message to the ONU 1 to the ONU n at the first downlink wavelength, where the wavelength configuration message includes a correct uplink wavelength indication message and a correct downlink wavelength indication message. Thus all the ONU 1 to the ONU n working at the first downlink wavelength as the current downlink wavelength will receive the wavelength configuration message.

Here the format of the wavelength configuration message is still substantially consistent as the format in Table 1. However a difference from the format of the wavelength configuration message described with reference to FIG. 2 is that the Vendor-ID and VSSN fields are set to 0.

Next in the step S302, the ONU1 to the ONU n tune a current uplink wavelength and the current downlink wavelength respectively to a correct uplink wavelength and a correct downlink wavelength according to the correct uplink wavelength indication message and the correct downlink wavelength indication message. Thus all the ONU1 to the ONU n will operate at the correct uplink wavelength and the correct downlink wavelength in subsequent communication. Furthermore, the ONU 1 and the ONU n can also replace the current uplink wavelength and the current downlink wavelength respectively with the correct uplink wavelength and the correct downlink wavelength in the step S302 to thereby communicate with the OLT still at the correct uplink wavelength and the correct downlink wavelength when they start next time.

Figure 4:
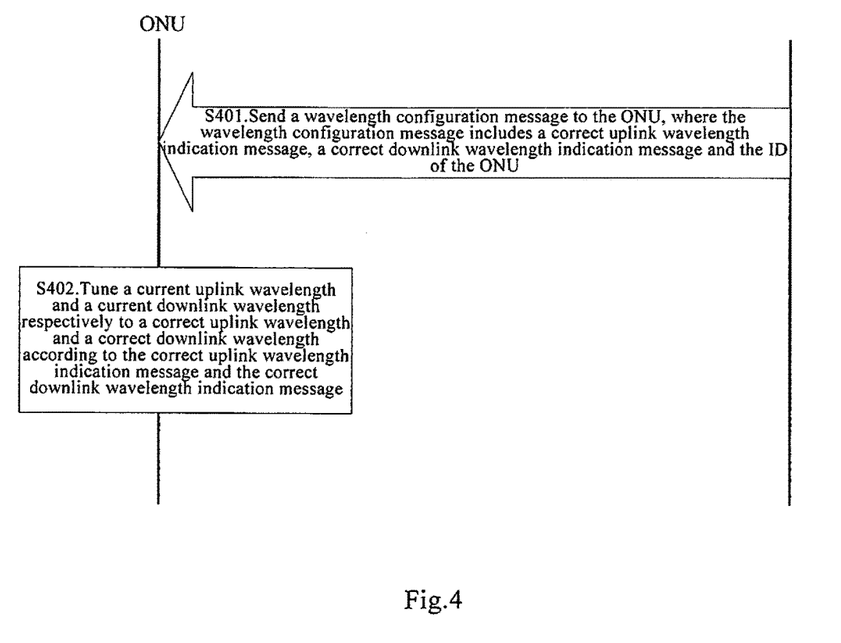
FIG. 4 illustrates a schematic flow chart of a systematic method according to still another embodiment of the invention.

FIG. 4 illustrates a schematic flow chart of a systematic method according to still another embodiment of the invention. In an exemplary application scenario in FIG. 4, an OLT adjusts a wavelength of a specific ONU during the ONU operation progress.

As illustrated in FIG. 4, in the step S401, the OLT sends a wavelength configuration message to the ONU, where the wavelength configuration message includes a correct uplink wavelength indication message, a correct downlink wavelength indication message and the ID of the ONU. The ID of the ONU is assigned by the OLT during the ONU activation progress, for example, in the step 6 in FIG. 1 and the step S110 in FIG. 2.

Here the format of the wavelength configuration message is also still consistent with the format in Table 1. However a difference from the formats of the wavelength configuration message described with reference to FIG. 2 and FIG. 3 is that the wavelength configuration message is directed instead of being broadcasted, so ONU-ID is set to the ID assigned by the OLT to the ONU during the activation progress, and the Vendor-ID and VSSN fields are set to 0 (of course, the Vendor-ID and the VSSN can alternatively be set to the Vendor-ID and the VSSN of the ONU).

Next in the step S402, the ONU tunes a current uplink wavelength and a current downlink wavelength respectively to a correct uplink wavelength and a correct downlink wavelength according to the correct uplink wavelength indication message and the correct downlink wavelength indication message. Thus the ONU will operate at the correct uplink wavelength and the correct downlink wavelength in subsequent communication.

A new downlink PLOAM message has been given in the foregoing three embodiments. Table 2 further summarizes features of the wavelength configuration message (Assign_ONU-Wavelength message). In the invention, the OLT configures/assigns automatically the ONU with the correct uplink/downlink wavelength by using this message.

TABLE 2

Summary of Assign_ONU-Wavelength message

| Message type ID | Message name | Function | Trigger mechanism | Reception effect |
| --- | --- | --- | --- | --- |
| TBD (numbered by ITU-T) | Assign_ONU-Wavelength | Configure automatically the ONU with the correct uplink/downlink wavelength | 1. During the ONU activation progress, the OLT obtains the serial number information of the ONU and judges that the ONU does not operate at the correct uplink/downlink wavelength; and 2. During the ONU operation progress, the OLT decides to change the uplink/downlink wavelength of the ONU. | ONU tunes its receiver and transmitter respectively to the correct downlink wavelength and uplink wavelength |

It shall be appreciated that the foregoing embodiments are merely illustrative but will not limit the invention. Any technical solutions without departing from the spirit of the invention shall fall into the scope of invention, including the use of different technical solutions appearing in different embodiments, and an apparatus and a method can be combined to advantage. Moreover any reference numerals in the claims shall not be construed as limiting the claims in question; and the term "comprising" will not preclude another device(s) or step(s) which is (are) listed in the other claim(s) or the description.

The invention claimed is:

1. A method, in an optical line terminal, of configuring a wavelength of an optical network unit during an optical network unit activation progress, the method comprising:
   sending a wavelength configuration message, if the optical network unit does not operate at least one of a correct uplink wavelength or a correct downlink wavelength, the correct uplink wavelength or the correct downlink wavelength based upon a virtual network operator, the wavelength configuration message including (i) at least one of a correct uplink wavelength indication message or a correct downlink wavelength indication message, (ii) a Vendor-ID of the optical network unit and (iii) a Vendor-specific serial number of the optical network unit; and
   allocating an identifier of the optical network unit for the optical network unit after sending the wavelength configuration message.

2. The method of claim 1, further comprising:
   judging whether the optical network unit operates at least one of a correct uplink wavelength or a correct downlink wavelength.

3. A method, in an optical line terminal, of configuring a wavelength of an optical network unit during an optical network unit activation process, the method comprising:
   receiving serial number information from the optical network unit, the serial number information including a Vendor-ID of the optical network unit and a Vendor-specific serial number of the optical network unit;
   judging whether the optical network unit operates at least one of a correct uplink wavelength or a correct downlink wavelength according to the serial number information; and
   sending a wavelength configuration message, if the optical network unit does not operate at least one of the correct uplink wavelength or the correct downlink wavelength, the wavelength configuration message including (i) at least one of a correct uplink wavelength indication message or a correct downlink wavelength indication message, (ii) the Vendor-ID of the optical network unit, and (iii) the Vendor-specific serial number of the optical network unit, wherein the judging step includes,
      judging whether the optical network unit operates at least one of the correct uplink wavelength or the correct downlink wavelength by referring to a database in the optical line terminal, wherein the database stores a correspondence relationship between a serial number of the optical network unit and the at least one of the correct uplink wavelength or correct downlink wavelength, or
      judging whether the optical network unit operates at least one of the correct uplink wavelength or the correct downlink wavelength by communicating the serial number information of the optical network unit with another network element to obtain the at least one of the correct uplink wavelength or the correct downlink wavelength at which the optical network unit shall operate.

4. The method according to claim 3, wherein at least one of,
- the correct uplink wavelength indication message includes a correct uplink wavelength value or a correct uplink wavelength channel number or wavelength adjustment information associated with the correct uplink wavelength, or
- the correct downlink wavelength indication message includes a correct downlink wavelength value or a correct downlink wavelength channel number or wavelength adjustment information associated with the correct downlink wavelength.

5. A method, in an optical network unit, of assisting an optical line terminal in configuring a wavelength of the optical network unit during an optical network unit activation progress, the method comprising:
- receiving a wavelength configuration message sent by the optical line terminal, the wavelength configuration message including, a Vendor-ID of the optical network unit, a Vendor-specific serial number of the optical network unit, and at least one of a correct uplink wavelength indication message or a correct downlink wavelength indication message;
- judging whether the Vendor-ID of the optical network unit and the Vendor-specific serial number of the optical network unit in the wavelength configuration message are consistent respectively with a Vendor-ID of the optical network unit and a Vendor-specific serial number of the optical network unit; and
- tuning at least one of a current uplink wavelength or a current downlink wavelength respectively to at least one of a correct uplink wavelength or a correct downlink wavelength according to the respective one of the correct uplink wavelength indication message and the correct downlink wavelength indication message, if they are consistent, the correct uplink wavelength or the correct downlink wavelength based upon a virtual network operator,
- wherein the receiving, the judging, and the tuning are performed before the optical line terminal allocates an identifier of the optical network unit for the optical network unit.

6. The method according to claim 5, wherein at least one of
- the correct uplink wavelength indication message includes a correct uplink wavelength value or a correct uplink wavelength channel number or wavelength adjustment information associated with the correct uplink wavelength, or
- the correct downlink wavelength indication message includes a correct downlink wavelength value or a correct downlink wavelength channel number or wavelength adjustment information associated with the correct downlink wavelength.

7. The method according to claim 6, wherein the optical network unit is capable of buffering the correct uplink wavelength and the correct downlink wavelength, and the tuning comprises:
- replacing the current uplink wavelength or the current downlink wavelength with the correct uplink wavelength or the correct downlink wavelength, respectively.

8. A method, in an optical network unit, of assisting an optical line terminal in configuring a wavelength of the optical network unit during an optical network unit activation progress, the method comprising:
- sending serial number information to the optical line terminal, the serial number information including a Vendor-ID of the optical network unit itself and a Vendor-specific serial number of the optical network unit itself;
- receiving a wavelength configuration message sent by the optical line terminal, the wavelength configuration message including, the Vendor-ID of the optical network unit, the Vendor-specific serial number of the optical network unit, and at least one of a correct uplink wavelength indication message or a correct downlink wavelength indication message;
- judging whether the Vendor-ID of the optical network unit and the Vendor-specific serial number of the optical network unit in the wavelength configuration message are consistent respectively with a Vendor-ID of the optical network unit and a Vendor-specific serial number of the optical network unit; and
- tuning at least one of a current uplink wavelength or a current downlink wavelength respectively to at least one of a correct uplink wavelength or a correct downlink wavelength according to the respective one of the correct uplink wavelength indication message and the correct downlink wavelength indication message, if they are consistent, the correct uplink wavelength or the correct downlink wavelength based upon a virtual network operator,
- wherein the receiving and the tuning are performed before the optical line terminal allocates an identifier of the optical network unit for the optical network unit.

9. A method, in an optical line terminal, of configuring a wavelength of an optical network unit during an optical network unit operation progress, wherein at least one optical network unit communicates with the optical line terminal at a first downlink wavelength as a current downlink wavelength, the method comprising:
- sending a wavelength configuration message to the at least one optical network unit at the first downlink wavelength, the wavelength configuration message including at least one of a correct uplink wavelength indication message or a correct downlink wavelength indication message, the correct uplink wavelength indication message or the correct downlink wavelength indication message based upon a virtual network operator; and
- allocating an identifier of the optical network unit for the optical network unit after sending the wavelength communication message.

10. The method according to claim 9, wherein at least one of
- the correct uplink wavelength indication message includes a correct uplink wavelength value or a correct uplink wavelength channel number or wavelength adjustment information associated with a correct uplink wavelength, or
- the correct downlink wavelength indication message includes a correct downlink wavelength value or a correct downlink wavelength channel number or wavelength adjustment information associated with a correct downlink wavelength.

11. A method, in an optical network unit, of assisting an optical line terminal in configuring a wavelength of the optical network unit during an optical network unit operation progress, wherein the optical network unit communicates with the optical line terminal at a first downlink wavelength as a current downlink wavelength, and the method comprises:

receiving a wavelength configuration message sent by the optical line terminal at the first downlink wavelength, the wavelength configuration message including at least one of a correct uplink wavelength indication message or a correct downlink wavelength indication message; and tuning a current uplink wavelength or a current downlink wavelength respectively to a correct uplink wavelength or a correct downlink wavelength according to the correct uplink wavelength indication message or the correct downlink wavelength indication message, the correct uplink wavelength or the correct downlink wavelength based upon a virtual network operator, wherein the receiving and the tuning are performed before the optical line terminal allocates an identifier of the optical network unit for the optical network unit.

12. The method according to claim 11, wherein the optical network unit is capable of buffering the at least one of the correct uplink wavelength and the correct downlink wavelength, and the tuning step further comprises:

replacing the current uplink wavelength or the current downlink wavelength respectively with the correct uplink wavelength or the correct downlink wavelength.

13. A method, in an optical line terminal, of configuring a wavelength of an optical network unit during an optical network unit operation progress, the method comprising:

sending a wavelength configuration message to the optical network unit, the wavelength configuration message including (i) a correct uplink wavelength indication message or a correct downlink wavelength indication message, and (ii) an identifier of the optical network unit; and allocating an identifier of the optical network unit for the optical network unit after sending the wavelength configuration message, wherein at least one of
the correct uplink wavelength indication message includes a correct uplink wavelength value or a correct uplink wavelength channel number or wavelength adjustment information associated with a correct uplink wavelength, or
the correct downlink wavelength indication message includes a correct downlink wavelength value or a correct downlink wavelength channel number or wavelength adjustment information associated with a correct downlink wavelength, and wherein the identifier of the optical network unit is allocated by the optical line terminal for the optical network unit during an optical network unit activation progress, and the correct uplink wavelength indication message or the correct downlink wavelength indication message are based upon a virtual network operator.

14. A method, in an optical network unit of assisting an optical line terminal in configuring a wavelength of the optical network unit during an optical network unit operation progress, the method comprising:

receiving a wavelength configuration message from the optical network unit, the wavelength configuration message including at least one of a correct uplink wavelength indication message or a correct downlink wavelength indication message, and an identifier of the optical network unit, wherein at least one of
the correct uplink wavelength indication message includes a correct uplink wavelength value or a correct uplink wavelength channel number or wavelength adjustment information associated with a correct uplink wavelength or
the correct downlink wavelength indication message includes a correct downlink wavelength value or a correct downlink wavelength channel number or wavelength adjustment information associated with a correct downlink wavelength, and wherein
the identifier of the optical network unit is allocated by the optical line terminal for the optical network unit during an optical network unit activation progress; and tuning a current uplink wavelength or a current downlink wavelength respectively to the correct uplink wavelength or the correct downlink wavelength according to the correct uplink wavelength indication message or the correct downlink wavelength indication message, the correct uplink wavelength indication message or the correct downlink wavelength indication message based upon a virtual network operator, wherein the receiving and the tuning are performed before the optical line terminal allocates an identifier of the optical network unit for the optical network unit.

\* \* \* \* \*